US011382449B2

(12) United States Patent
Lee et al.

(10) Patent No.: US 11,382,449 B2
(45) Date of Patent: Jul. 12, 2022

(54) STEAM GENERATOR AND COOKING APPARATUS INCLUDING STEAM GENERATOR

(71) Applicant: LG ELECTRONICS INC., Seoul (KR)

(72) Inventors: Soochan Lee, Seoul (KR); Jaekyung Yang, Seoul (KR); Haksoon Yang, Seoul (KR); Yongsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 16/481,044

(22) PCT Filed: Jan. 23, 2018

(86) PCT No.: PCT/KR2018/001034
§ 371 (c)(1),
(2) Date: Jul. 25, 2019

(87) PCT Pub. No.: WO2018/139839
PCT Pub. Date: Aug. 2, 2018

(65) Prior Publication Data
US 2019/0387913 A1 Dec. 26, 2019

(30) Foreign Application Priority Data
Jan. 25, 2017 (KR) .................. 10-2017-0012317

(51) Int. Cl.
*A47J 27/04* (2006.01)
*A47J 36/32* (2006.01)
(Continued)

(52) U.S. Cl.
CPC .............. *A47J 27/04* (2013.01); *A47J 36/32* (2013.01); *F22B 1/284* (2013.01); *F22D 5/26* (2013.01);
(Continued)

(58) Field of Classification Search
CPC ..... A47J 27/04; A47J 2027/043; F22B 1/284; F24C 15/003
See application file for complete search history.

(56) References Cited

U.S. PATENT DOCUMENTS 5,058,194 A 10/1991 Violi
2007/0210059 A1* 9/2007 Ando ................. F22B 1/284
219/401

(Continued)

FOREIGN PATENT DOCUMENTS

DE 10 2011 054687 4/2013
DE 11 2012 003492 5/2014
(Continued)

OTHER PUBLICATIONS

Machine translation of JP2008270123 (A) (Year: 2008).*
(Continued)

*Primary Examiner* — Erin E McGrath
(74) *Attorney, Agent, or Firm* — KED & Associates LLP

(57) ABSTRACT

A steam generator and a cooking apparatus having a steam generator are provided. The steam generator may include a steam generation tube; an inflow tube configured to provide a passage so that water is introduced into the steam generation tube; at least one heater disposed on an outer surface of the steam generation tube to heat the water and generate steam; a discharge tube disposed above the steam generation tube to provide a passage so that the steam is discharged; and an adaptor unit configured to branch discharge water and the steam discharged from the discharge tube. The discharge tube may have an inner diameter that gradually increases in an upward direction.

19 Claims, 6 Drawing Sheets

(51) Int. Cl.
*F22B 1/28* (2006.01)
*F22D 5/26* (2006.01)
*F24C 15/00* (2006.01)

(52) U.S. Cl.
CPC ....... *F24C 15/003* (2013.01); *A47J 2027/043* (2013.01)

(56) References Cited

U.S. PATENT DOCUMENTS

2008/0193110 A1* 8/2008 Rusche .................. F22B 1/284
392/337
2014/0097173 A1 4/2014 Becker et al.

FOREIGN PATENT DOCUMENTS

| DE | 2566022 | 4/2016 |
|---|---|---|
| JP | H 07-243649 | 9/1995 |
| JP | H 1194203 | 4/1999 |
| JP | 2008-270123 | 11/2008 |
| KR | 100 662 473 | 1/2007 |
| KR | 10-2012-0121155 | 11/2012 |

OTHER PUBLICATIONS

Machine translation of ES2566022 (Year: 2016).*
European Search Report dated Nov. 10, 2020.
International Search Report (with English Translation) and Written Opinion dated May 1, 2018 issued in Application No. PCT/KR2018/001034.

* cited by examiner

STEAM GENERATOR AND COOKING APPARATUS INCLUDING STEAM GENERATOR

CROSS-REFERENCE TO RELATED APPLICATIONS

This application is a U.S. National Stage Application under 35 U.S.C. § 371 of PCT Application No. PCT/KR2018/001034, filed Jan. 23, 2018, which claims priority to Korean Patent Application No. 10-2017-0012317 filed on Jan. 25, 2017, whose entire disclosures are hereby incorporated by reference.

BACKGROUND

1. Field

A steam generator, and a cooking apparatus including a steam generator are disclosed herein.

2. Background

Cooking apparatuses are home appliances that heat an object to be cooked (hereinafter, referred to as a "cooking object") using electricity or gas. When a cooking object is cooked in a cooking apparatus, moisture of the cooking object may be evaporated during heating. Thus, there has been introduced a cooking apparatus having a steam function that supplies steam to the cooking object to prevent the moisture of the cooking object from evaporating and the cooking object dried out. Such a cooking apparatus is provided with a steam generator that generates steam.

Examples of a cooking apparatus provided with a steam generator may include an oven, a range, and a coffee machine, for example.

A steam generator may include a reservoir tank in which water supplied from an external water supply source is reserved, a heating tube through which the water supplied from the external water supply source flows, and a heating portion or heater that heats the water reserved in the reservoir tank or the water flowing through the heating tube. Also, the steam generator may heat the water supplied from the external water supply source to generate saturated steam, and the saturated steam may be heated again to be supplied to a cooking chamber of the cooking apparatus.

In a related prior art document U.S. Publication No.: US2014/0097173 A1, published Apr. 10, 2014 and entitled "Cooking Device with a Steam-Generating Element", which is hereby incorporated by reference, a steam generator is mounted on a rear surface of a cavity of an oven to allow steam to be introduced into the cavity within the oven. In detail, in the steam generator disclosed in the related prior art document, water is introduced into a storage tank and then passes through a tube, on which a heater is mounted, from the storage tank to generate steam. The steam flows again to an upper side of the storage tank to flow to an oven chamber through a discharge hole defined in a vicinity of a point into which the water is introduced.

However, the steam generator disclosed in the prior art document has the following disadvantages.

First, all of an inlet and an outlet of the tube on which the heater is attached so as to generate steam are connected to a storage tank into which water is introduced, and a unit for measuring or adjusting an amount of introduced water is not provided. Thus, as the amount of introduced water is not confirmed, when a water level is high, the water may be discharged to an inside of the oven together with the steam. Also, condensed water generated by condensing the steam in the discharge hole may be discharged into the oven together with the steam.

Second, an inflow hole through which the water is introduced and the discharge hole through which the water is discharged to the inside of the oven may be provided in an upper portion of the storage tank in parallel to each other. Thus, injection of the water and discharge of the steam may not be performed at the same time. As a result, as the steam is not continuously injected into the oven, cooking ability of the cooking apparatus may be deteriorated, and a steam generation time may increase.

Third, the steam generator has a structure in which residual water is not drained when the operation of the steam generator is stopped after generating the steam. Thus, as the residual water within the storage tank is stagnant, it may be difficult to confirm a water level, and thus, generation of scale may increase. In addition, a generation rate of the scale may increase.

The term "scale" refers to a material formed when water is heated or cooled in an electric heating appliance. For example, limestone is dissolved in acidic water, which passes through rocks or is permeated, and then dissolved into calcium and acid carbonate ions to cure water. When hard water generated as described above is introduced into the electric heating appliance, the hard water precipitates due to a change in solubility of the calcium and acid carbonate ions to form scale which hardens on an electric heating surface, thereby blocking a pipe.

A shape of the scale may depend on a content of inorganic material of the water used. For example, the shape and material of the scale may include calcium carbonate, calcium sulfate, barium sulfate, silica, and iron scale, for example.

When the scale is formed, thermal conductivity of the scale varies less than that of a pipe material deteriorating heat transfer performance. Also, a flow rate is reduced due to a fine change in a tube diameter, and a pressure loss through the electric heating appliance increases.

SUMMARY

Embodiments disclosed herein provide a steam generator in which high-temperature, high-pressure steam in comparison to the steam according to the related art is provided in a cavity of a cooking apparatus to improve performance of the steam generator, and a cooking apparatus including the steam generator.

Embodiments disclosed herein also provide a steam generator capable of solving a limitation in which water is discharged to a cavity together with steam due to a Dolby phenomenon which occurs when the steam generator is locally overheated during generation of the steam, and a cooking apparatus including the steam generator.

Embodiments disclosed herein further provide a steam generator capable of solving a limitation in which an amount of water to be injected into the steam generator is not confirmed and a limitation in which, when a use time increases, a high water level occurs in the steam generator so that the water is discharged to a cavity. Embodiments disclosed herein provide a steam generator capable of solving a limitation in which steam generated in the steam generator is condensed in a discharge hole, and the condensed water is discharged to a cavity, and a cooking apparatus including the steam generator.

Embodiments disclosed herein additionally provide a steam generator capable of solving a limitation in which injection of water and discharge of steam are not performed at the same time and capable of reducing a steam generation time, and a cooking apparatus including the steam generator. Embodiments disclosed herein further provide a steam generator capable of solving a limitation in which a water level is not confirmed due to residual water because water is not drained after the steam generator operates and a limitation in which a scale generation rate increases due to the residual water, and a cooking apparatus including the steam generator.

In a steam generator according embodiments disclosed herein and a cooking apparatus including the steam generator, a discharge tube connected to an upper portion of the steam generation tube to discharge generated steam may have a cone shape, and the discharge tube and a second connection tube of an adaptor unit may be connected to each other so that an internal pressure of the steam generation tube increases by a venturi effect. Thus, as relatively high-temperature, high-pressure steam in comparison to the steam according to the related art may be generated to be provided to the cooking apparatus, thereby improving performance of the steam generator.

A steam generator and a cooking apparatus including a steam generator according to embodiments disclosed herein may include a steam generation unit and an adaptor unit connected to the steam generation unit. As the adaptor unit may include a collection tube through which water discharged together with steam by a Dolby phenomenon in the steam generation unit is introduced again into an inflow tube of the steam generation unit, the water discharged together with the steam by the Dolby phenomenon may be introduced again into the collection tube to prevent the water together with the steam from being discharged to the cavity. Also, a feedback structure in which the water introduced into the collection tube is introduced again into the inflow of the steam generation unit may be provided to collect and reuse the water.

A steam generator and a cooking apparatus including a steam generator according to embodiments disclosed herein may include a steam generation unit and an adaptor unit. As the adaptor unit may include a collection tube and a water level sensor installed at one side of the collection tube, an amount of water injected and supplied to the steam generator may be confirmed to adjust an amount of water. Thus, when a water level is high, the water may be prevented from being discharged together with the steam.

A steam generator and a cooking apparatus including a steam generator according to embodiments disclosed herein may include a steam generation unit and an adaptor unit. The steam generation unit may include a steam generation tube and a discharge tube disposed above the steam generation tube to discharge steam, and the discharge tube may have a cone (conic) shape that gradually decreases in cross-sectional area toward a discharge hole. Thus, condensed water generated by being condensed when the steam is discharged may be collected again into the steam generation tube by the small cross-section and then be reheated to reduce an amount of water discharged to the cavity.

A steam generator and a cooking apparatus including a steam generator according to embodiments disclosed herein may include a steam generation unit and an adaptor unit. The adaptor unit may include an injection tube for water supply and a steam discharge tube that discharges the steam, which are separated from each other. Thus, inflow of the water through the injection tube and the discharge of the steam through the steam discharge tube may be performed at the same time.

A steam generator and a cooking apparatus including a steam generator according to embodiments disclosed herein may include a steam generation unit and an adaptor unit. The adaptor unit may include a water supply tube, and the water supply tube may serve as a drain tube, through which residual water may be drained when an operation for generating the steam in the steam generator is stopped, to reduce a scale generation rate and an amount of generated scale.

The details of one or more embodiments are set forth in the accompanying drawings and the description below. Other features will be apparent from the description and drawings, and from the claims.

DETAILED DESCRIPTION OF THE EMBODIMENTS

Figure 1:
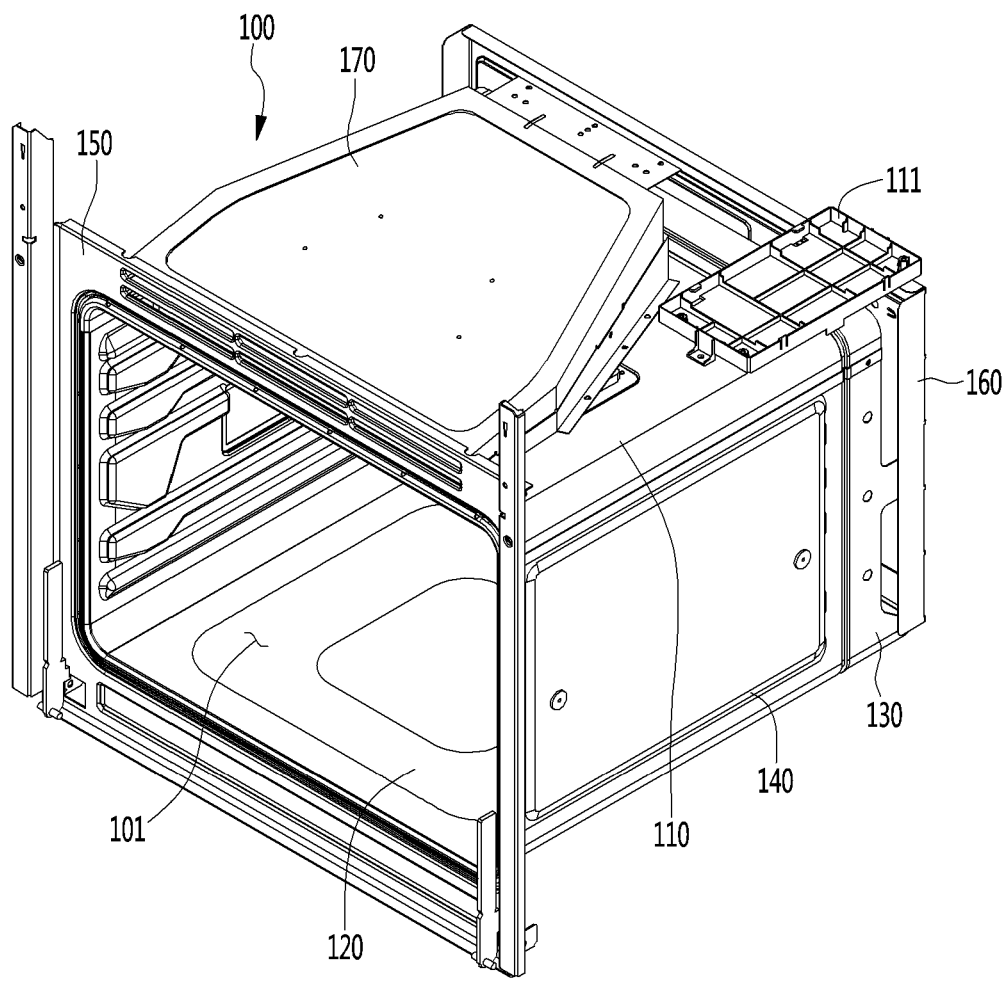
FIG. 1 is a perspective view of a cooking apparatus including a steam generator according to an embodiment.

Hereinafter, embodiments will be described with reference to the accompanying drawings. It should be noted that when components in the drawings are designated by reference numerals, the same or like components may have the same or like reference numerals wherever possible even though the components are illustrated in different drawings. In the following description, description of known functions and configurations incorporated herein will be omitted to avoid confusion.

In the description of the elements, the terms first, second, A, B, (a), and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
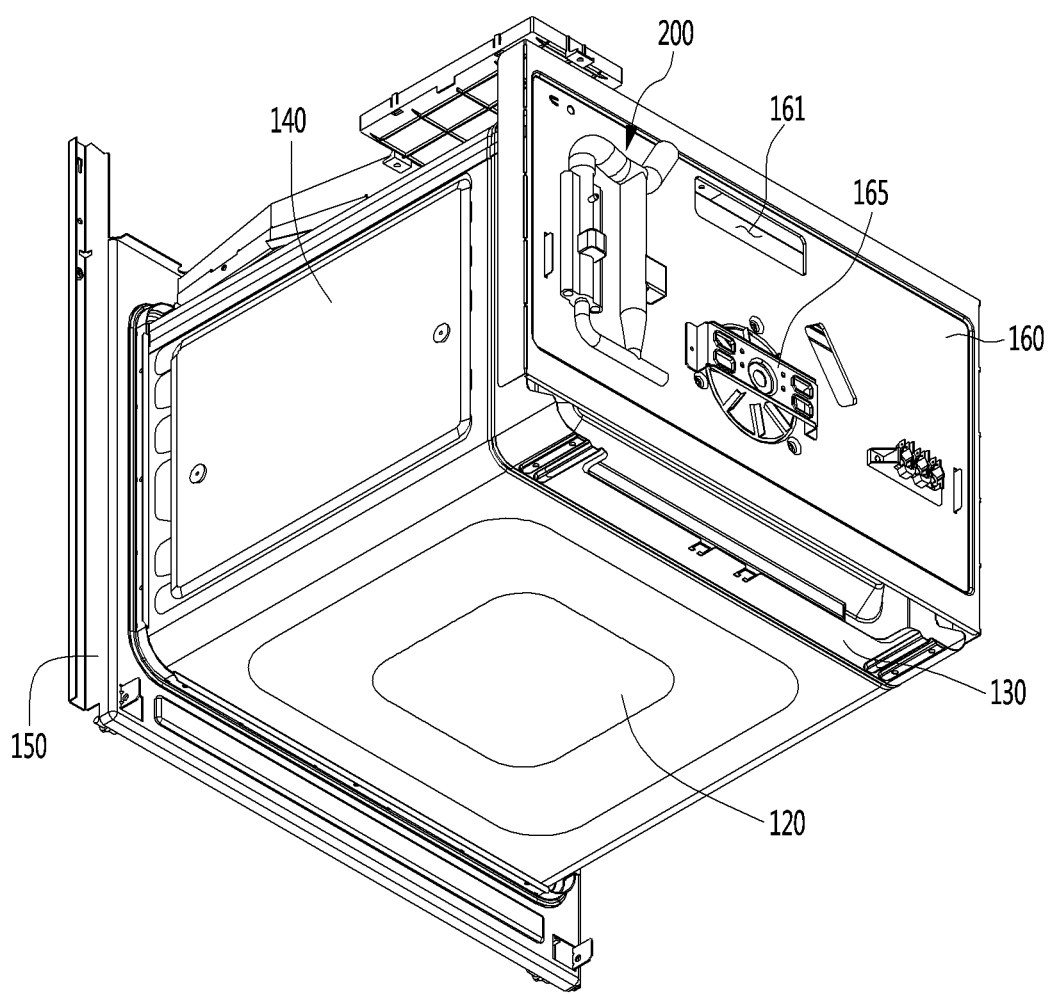
FIG. 2 is a rear perspective view of the cooking apparatus including the steam generator according to an embodiment.
Figure 3:
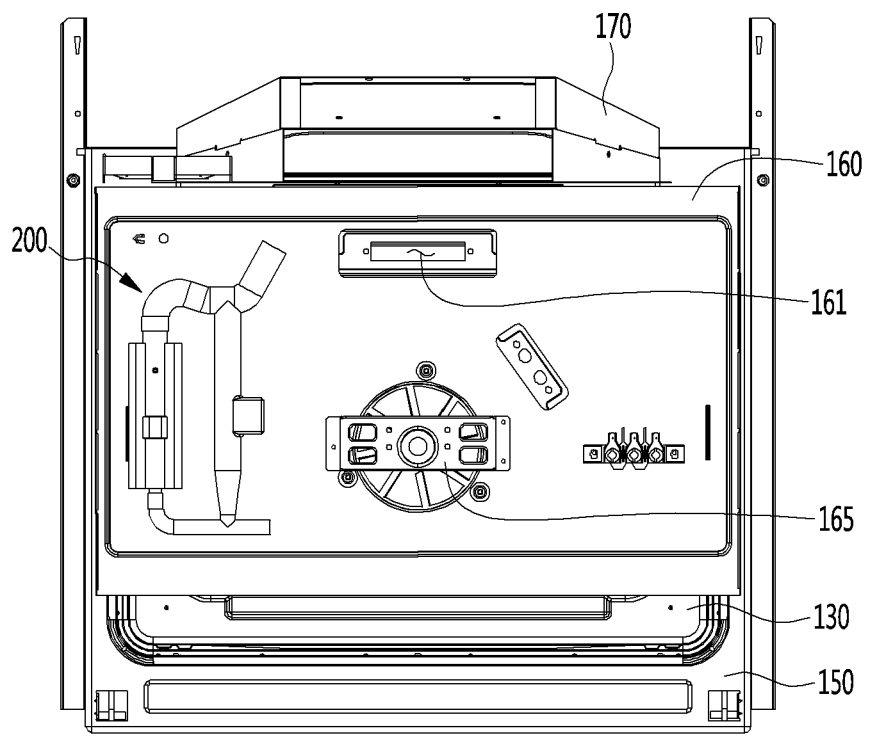
FIG. 3 is a rear view of the cooking apparatus including the steam generator according to an embodiment.

FIG. 1 is a perspective view of a cooking apparatus including a steam generator according to an embodiment, FIG. 2 is a rear perspective view of the cooking apparatus including the steam generator according to an embodiment. FIG. 3 is a rear view of the cooking apparatus including the steam generator according to an embodiment.

Referring to FIGS. 1 to 3, a cooking apparatus according to an embodiment may include a cavity 100. A cooking chamber 101 may be provided within the cavity 100. The cooking chamber 101 may provide a space for cooking food or other items (hereinafter, collectively "food").

The cavity 100 may include an upper plate 110, a bottom plate 120, a rear plate 130, and side plates 140. The upper plate 110 and the bottom plate 120 may define a top surface and a bottom surface of the cavity 100, respectively. The rear plate 130 may define a rear surface of the cavity 100, and the side plates 140 may define both side surfaces of the cavity 100.

The cooking apparatus may further include an outer case (not shown) and a door (not shown) that surrounds the upper plate 110 and the side plates 140. The outer case may have a longitudinal cross-section with an approximately ⊏ shape. For example, the cavity 100 may have a polyhedral shape with an open front surface.

Each of the bottom plate 120, the rear plate 130, the upper plate 110, and the side plates 140 may have a rectangular shape. However, embodiments are not limited to only the rectangular shape.

The upper plate 110 and the bottom plate 120 may define a ceiling and a bottom surface of the cooking chamber 101, respectively. The rear plate 130 and the side plates 140 may define a rear surface and both side surfaces of the cooking chamber 101.

An irradiation opening (not shown) and a porous portion (not shown) may be defined in the upper plate 110. The irradiation opening may be understood as an inlet through which microwaves generated in or by a magnetron (not shown) are irradiated into the cooking chamber 101. Also, the porous portion may be understood as a portion through which energy, that is, light and heat of a halogen heater (not shown) may be transmitted to an inside of the cooking chamber 101.

A plurality of suction holes (not shown) and discharge holes (not shown) may be defined in the rear plate 130. The plurality of suction hole may be understood as holes through which air may be suctioned from the inside of the cooking chamber 101 into a convection chamber (not shown) which will be described hereinafter. The discharge holes may be understood as holes through which air may be discharged from an inside of the convection chamber into the cooking chamber 101. That is, the cooking chamber 101 and the convection chamber may substantially communicate with each other through the suction hole and the discharge holes.

A plurality of cooking chamber exhaust holes (not shown) may be defined in one or a first side plate of the side plates 140. The cooking chamber exhaust holes may be understood as outlets through which the air supplied to the inside of the cooking chamber 101 together with the microwaves through the irradiation opening may be discharged outside of the cooking chamber 101. A steam injection hole (not shown) may be defined in the other or a second side plate of the side plates 140. The steam injection holes may be understood as holes through which steam generated in the steam generator 200 may be supplied to the inside of the cooking chamber 101.

The defined position of the steam injection holes is not limited to the side plates 140. For example, the steam injection holes may be defined in the rear plate 130 so that the steam generated in the steam generator 200 may be discharged into the cooking chamber 101 through the steam injection holes of the rear plate by passing through a back plate 160 which will be described hereinafter.

The cavity 100 may further include a front plate 150 and the back plate 160, which may be respectively disposed at front and rear ends of the cavity 100. A rear surface of the front plate 150 may be installed to be fixed to front ends of the upper plate 110, the bottom plate 120, and the side plates 140. Also, a front surface of the back plate 160 may be installed to be a portion of a rear surface of the rear plate 130.

The back plate 160 may have a rectangular shape. For example, an edge of a lower end of the back plate 160 may be parallel to an edge of a lower end of the rear plate 130.

The back plate 160 may include a communication opening 161 defined at an upper end thereof. The communication opening 161 may allow an upper portion of the cavity 100 to communicate with an electric room (not shown). The electric room may be defined at a rear surface of the back plate 160.

The cooking apparatus may further include a cooling fan capable of cooling the magnetron, a high-voltage transformer, a halogen heater, and the electric room. That is, the electric room may provide a space in which the cooling fan that cools a plurality of electronic components, such as the magnetron, and the high-voltage transformer, for example.

The magnetron (not shown) may oscillate microwaves irradiated into the cooking chamber 101. The high voltage transformer (not shown) may apply high-voltage current to the magnetron.

The cooking apparatus may further include a waveguide (not shown). The waveguide may direct microwaves oscillated from the magnetron to the inside of the cooking chamber 101. As a result, the cavity 100 may further include a waveguide installation portion 111 on which the waveguide may be installed. The waveguide installation portion 111 may be disposed on a top surface of the cavity 100, that is, the upper plate 110. Thus, the waveguide may be disposed on the top surface of the cavity 100.

The halogen heater may provide light and heat to the inside of the cooking chamber 101 through the porous portion. The halogen heater may be covered by a reflector (not shown) and an upper cover 170.

That is, the cavity 100 may further include the upper cover 170. The upper cover 170 may be disposed above the upper plate 110. A lamp to light the inside of the cooking chamber 101 may be installed on the upper plate 110. Thus, the upper cover 170 may cover the lamp.

The cooling fan may generate a flow of air that circulates through the inside of the cooking chamber 101. For example, the cooling fan may include two fans, and one fan motor that drives the fans. The fan may include a sirocco fan that suctions air in an axial direction to discharge the air in a circumferential direction.

An upper heater (not shown) may be installed at an upper portion of the cooking chamber 101. The upper heater may provide heat that radiation-heats the cooking object in the cooking chamber 101. A sheath heater may be used as the upper heater.

Also, although not shown, the cavity may further include the convection chamber. A convection heater and a convection fan may be provided in the convection chamber.

The convection heater may provide heat that convection-heats the cooking object in the cooking chamber 101. The convection fan may generate a flow of air that circulates through the cooking chamber 101 and the convection chamber. When the convection fan is driven, air may pass through the suction holes and the discharge holes to circulate through the cooking chamber 101 and the convection chamber. Thus, the heat of the convection heater may be convected to the cooking chamber 101 by the convection fan.

The cavity 100 may further include a convection motor that provides a drive force that drives the convection fan. The convection motor may be disposed in the electric room. Also, the convection motor may be installed to be fixed by a convection motor installation portion 165 disposed on the rear surface of the back plate 160.

The cooking apparatus may further include a steam generator 200 that generates steam to be supplied to the cooking chamber 101. As described above, the electric room may be defined at the rear surface of the back plate 160. The steam generator 200 may be installed in the electric room. The steam generator 200 may be installed on the rear surface of the back plate 160.

However, the installed position of the steam generator 200 is not limited to the back plate 160. For example, the steam generator 200 may be installed on the side plate 140.

The bottom plate 120 and a lower end of the rear plate 130, which may define a bottom surface of the cooking chamber 101, may be parallel to a support surface of the ground or furniture, on which the cooking apparatus is placed, so that the cooking chamber 101 may be disposed horizontally. That is, a lower end of the back plate 160 may be disposed in a direction perpendicular to a direction of gravity acting on the cavity 100.

When the steam generator 200 is installed in the electric room or on the back plate 160, an installed direction in which the injection tube 410 of the steam generator 200 is installed may not be limited thereto. However, to maintain the water supply and drain of the steam generator 200 and a function of the collection tube 440, the injection tube may be installed in parallel to the lower end of the back plate 160.

The cooking apparatus may further include a water supply tank. The water supply tank may store water supplied to the steam generator 200. The water supply tank may be connected to a pump (not shown) so that the water is supplied to the steam generator 200. For example, the pump may be disposed below the bottom plate 120. The pump may be understood as a component that pumps the water stored in the water supply tank to the steam generator 200.

The cooking apparatus may further include a drain pump (not shown) connected to the steam generator 200 to drain residual water remaining after generating the steam by the steam generator 200 and a drain tank (not shown) that accommodates storing the drained water.

A valve may be provided in each of the water supply tank and the drain device, and the water supply tank and the drain device may be connected to the injection tube. Thus, the water may be supplied to the steam generator 200 through the injection tube, and also, residual water of the stream generator 200 may be drained to the drain device through the injection tube. That is, the valve may allow the injection tube to be connected to one of the water supply tank or the drain device through a switching operation thereof.

Also, the valve may be switched by being interlocked or in communication with the water level sensor which will be described hereinafter. The valve of the passage connected to the water supply tank may be closed according to water level information detected by the water level sensor to stop the supply of the water to the steam generation unit 300.

Hereinafter, steam generator 200 according to an embodiment will be described.

Figure 4:
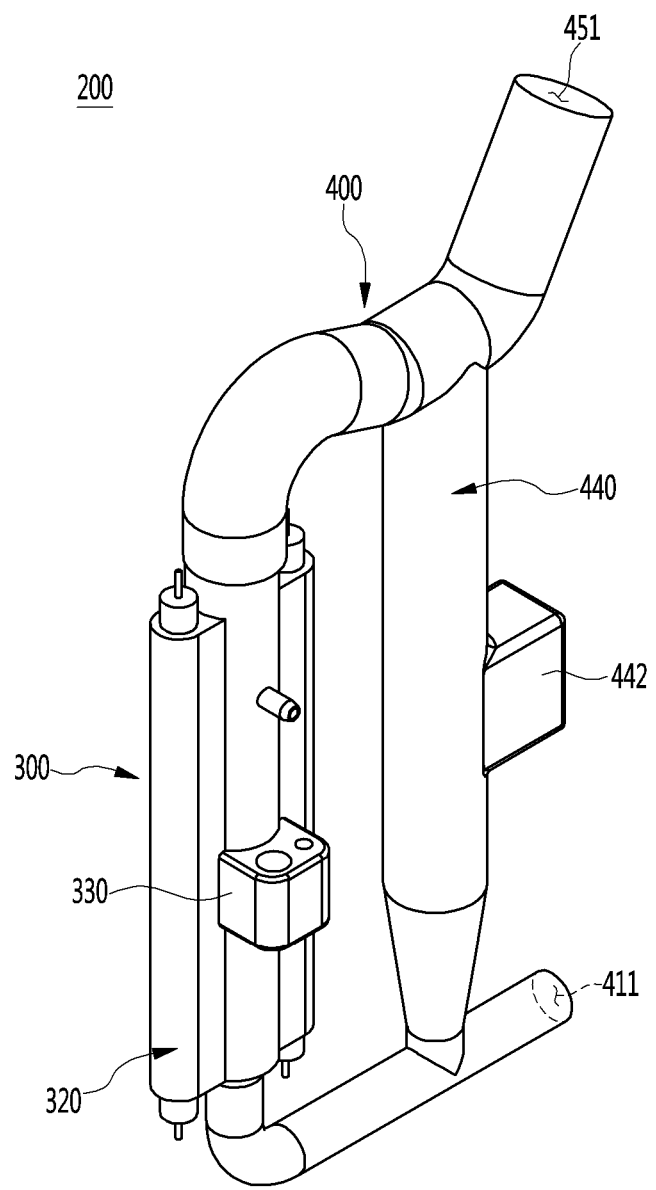
FIG. 4 is a view of the steam generator according to an embodiment.
Figure 5:
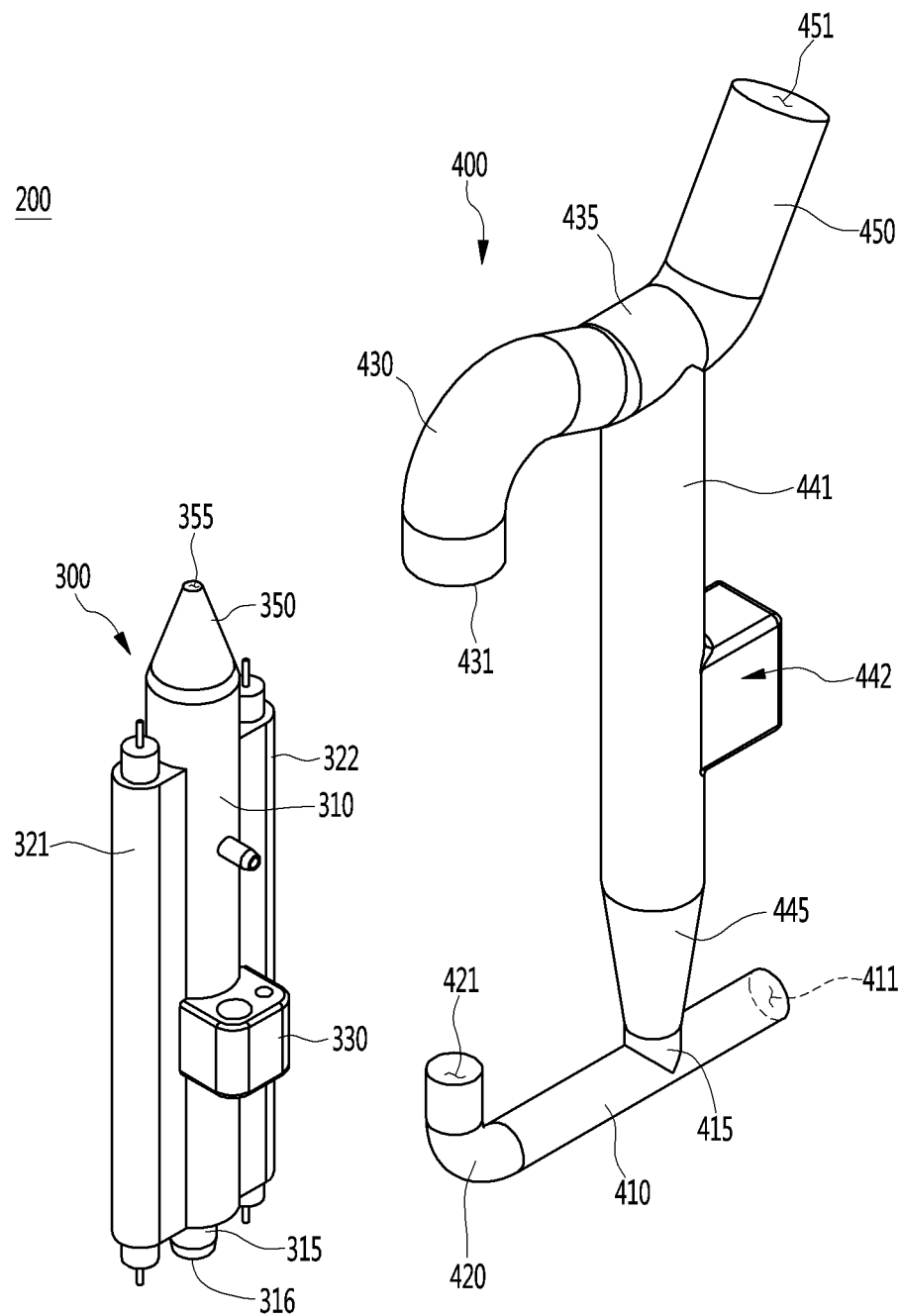
FIG. 5 is an exploded perspective view illustrating components of the steam generator according to an embodiment.
Figure 6:
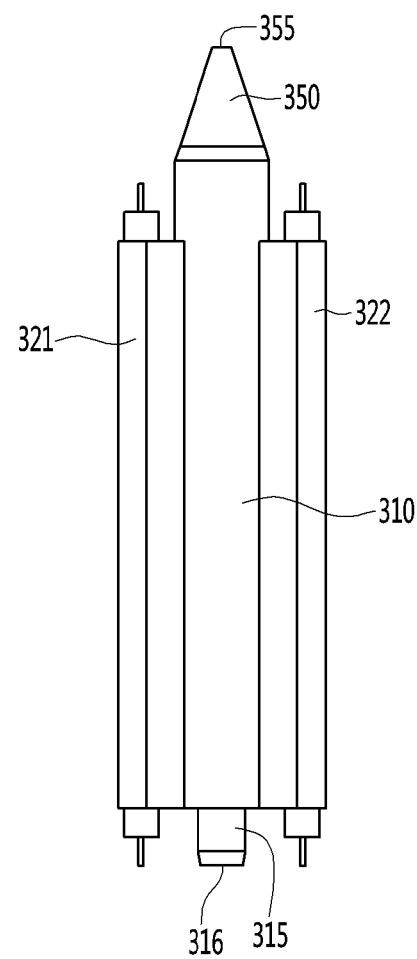
FIG. 6 is a view illustrating a steam generation unit of the steam generator according to an embodiment.

FIG. 4 is a view of the steam generator according to an embodiment. FIG. 5 is an exploded perspective view illustrating components of the steam generator according to an embodiment. FIG. 6 is a view illustrating a steam generation unit of the steam generator according to an embodiment.

Referring to FIGS. 4 to 6, the steam generator 200 may include a steam generation unit 300 that heats water to generate steam, and an adaptor unit 400 connected to the steam generation unit 300. The adaptor unit 400 may be connected to the water supply tank to supply water to the steam generation unit 300. Also, the adaptor 400 may be branched into passages so as to divide steam and water discharged from the steam generation unit 300. Thus, the steam may flow to the cooking chamber 101, and the water may be collected to be supplied again to the steam generation unit 300 through the adaptor unit 400.

The steam generation unit 300 may include a heater 320 that provides heat, and a steam generation tube 310 that accommodates the water. The steam generation tube 310 may receive heat from the heater 320 to heat the water accommodated therein, thereby generating steam. The water may be heated by the heat provided from the heater 320 and exist as a mixture of water, saturated steam, and superheated vapor, for example, in the steam generation tube 310 according to a degree of heating.

The steam generation tube 310 may be provided in the form of a long hollow tube, and thus, have a cylindrical shape. However, the shape of the steam generation tube 310 is not limited thereto. For example, the steam generation tube 310 may have various shapes. Also, the steam generation tube 310 may be made of a material having superior thermal conductivity performance.

The heater 320 may be disposed on a surface defining an outer circumference of the steam generation tube 310. That is, the heater 320 may be installed on an outer circumference of the steam generation tube 310. For example, the heater 320 may protrude from the outer circumference of the steam generation tube 310 and extend lengthwise in a longitudinal direction of the steam generation tube 310. The heater 320 may transfer heat through surface-contact with the steam generation tube 310.

A plurality of the heater 320 may be provided. The heater 230 may include a first heater 321 and a second heater 322. The first heater 321 may be disposed on one or a first side of the steam generation tube 310, and the second heater 322 may be disposed on the other or a second side of the steam generation tube 310 so as to be symmetrical to the first heater 321.

The first heater 321 and the second heater 322 may have a same shape. For example, the second heater 322 may be disposed symmetrical to the first heater 321 with respect to a central axis of the steam generation tube 310.

The first heater 321 may protrude from the outer circumference of the steam generation tube 310 in one direction and then may extend from one point at an upper portion of the steam generation tube 310 to a lower end of the steam generation tube 310. The one point at the upper portion of the steam generation tube 310 may be understood as a point spaced a predetermined distance downward from an upper end of the steam generation tube 310. Also, the heater 320 may be integrated with the steam generation tube 310.

The second heater 322 may be disposed symmetrical to the first heater 321 with respect to the central axis of the steam generation tube 310. Thus, the description of the second heater 322 may be the same as or similar to that of the first heater 321 described above.

The first heater 321 and the second heater 322 may be integrated with each other along the longitudinal direction of the steam generation tube 310 and be disposed in dual rows on both sides of the steam generation tube 310. That is, the first heater 321 and the second heater 322 may cover a relatively wide range on the outer circumference of the steam generation tube 310 to provide a row. The water heated by heat transferred from the heaters 321 and 322 to a surface of the steam generation tube 310 may be quickly and efficiently heated when compared to the related art.

The steam generation unit 300 may further include an inflow tube 315 that guides the water so that the water is introduced into the steam generation tube 310 and a discharge tube 350 that guides the steam so that the steam of the steam generation tube 310 is discharged to the adaptor unit 400.

The inflow tube 315 may have various shapes. For example, the inflow tube 315 may be provided as a hollow tube, and thus, have a cylindrical shape. The inflow tube 315 may have a diameter less than a diameter of the steam generation tube 310. Thus, the water passing through the inflow tube 315 may be more smoothly introduced into the steam generation tube 310.

One or a first side of the inflow tube 315 may be connected to a lower side of the steam generation tube 310, and the other or a second side of the inflow tube 315 may be connected to a first connection tube which will be described hereinafter. An inflow hole 316 through which the water may be introduced may be defined in a lower end of the inflow tube 315. The inflow tube 315 may be inserted into a first connection hole, which will be described hereinafter, and then be connected to a first connection tube 420. Thus, the inflow hole 316 may be understood as an inlet through which the water flowing through the first connection tube 420 may be introduced. An upper portion of the inflow tube 315 may be connected to a lower end of the steam generation tube 310 to guide the water introduced from the inflow hole 316 to the steam generation tube 310.

The discharge tube 350 may be disposed above the steam generation tube 310. An opening defined in one or a first side of the discharge tube 350 may be connected to the steam generation tube 310, and an opening defined in the other or a second side of the discharge tube 350 may be connected to a second connection tube 430 which will be described hereinafter.

A lower end of the discharge tube 350 may be connected to an upper end of the steam generation tube 310, and an upper end of the discharge tube 350 may be inserted into a second connection hole 431, which will be described hereinafter, and then be connected to the second connection tube 430. That is, the opening defined in the upper end of the steam generation tube 310 may communicate with the discharge tube 350. Thus, steam generated in the steam generation tube 310 may flow to the second connection tube 430 via the discharge tube 350.

The opening defined in the upper end of the discharge tube 350 may be referred to as a discharge hole 355. The steam introduced from the steam generation tube 310 may pass through the discharge hole 355 to flow to the second connection tube 430.

The discharge tube 350 may be provided as a hollow tube. Also, the discharge tube 350 may have an inner diameter that gradually decreases in an upward direction. That is, the discharge tube 350 may have a hollow that gradually decreases in diameter in the upward direction. For example, the discharge tube 350 may have a cone (conical) shape. The discharge tube 350 may have a truncated cone shape an inner diameter of which gradually decreases in the upward direction.

A smallest inner diameter of the inner diameter of the discharge tube 350 may be understood as a diameter of the discharge hole 355. Also, a largest inner diameter of the inner diameter of the discharge tube 350 may be understood as a diameter of the opening defined in the lower end of the discharge tube 350.

The opening of the discharge tube 350 may have a cross-sectional area that gradually decreases from the lower end to the upper end thereof. That is, a transverse cross-section of the discharge tube 350 may be understood as a cross-section an area of which gradually decreases toward the discharge hole 355.

The discharge hole 355 may have an inner diameter less than an inner diameter of the second connection tube 430, which will be described hereinafter, and that of a lowermost end of the discharge tube 350. Also, the lowermost end of the discharge tube 350 connected to the steam generation tube 310 may have the same inner diameter as the second connection tube 430. For example, each of the discharge tube 350 and the second connection tube 430 may provide a venturi tube. Thus, the steam flowing from the steam generation tube 310 to the second connection tube 430 via the discharge tube 350 may obtain a venturi effect.

The venturi effect refers to a phenomenon in which a pressure of a fluid is relatively reduced, and a velocity increased when passing through a narrow portion having a narrow and small diameter in a tube when compared to a case of passing through a wide and large diameter portion in the tube. That is, the discharge tube 350 having the truncated cone shape and the second connection tube 430 connected to the discharge tube 350 may provide a venturi tube with respect to a center of the discharge hole 355. Thus, an inner pressure in the steam generation tube 310 and the second connection tube 430 may be greater than a pressure in the discharge hole 355. Also, the velocity of the steam at the discharge hole 355 may increase according to the Bernoulli equation.

As a result, the discharge tube 350 may have an inner diameter that gradually decreases in the upward direction, and thus, the internal pressure in the steam generation tube 300 may relatively increase. Thus, relatively high-temperature, high-pressure steam may be generated in the inside of the steam generation tube 310. That is, the steam generator 200 according to embodiments may provide a relatively high-temperature, high-pressure steam while minimizing a thermal loss to improve a cooking performance of a cooking apparatus.

The steam generated in the steam generator 310 may be condensed while passing through the discharge tube 350. In the steam generator according to the related art, condensed water generated due to the condensation phenomenon may be discharged together with the steam and injected into the cavity. That is, steam generation efficiency and performance of the steam generator may be deteriorated.

On the other hand, in the steam generator 200 according to embodiments, the condensed water may be collected again into the steam generation tube 310 due to the shape of the discharge tube 350 and then be heated again. It is difficult to allow the condensed water to pass through the discharge hole 355 because the cross-sectional area of the discharge tube 350 decreases in the upward direction, and thus, the condensed water which does not pass through the discharge hole 355 may be collected into the steam generator 310 along an inner surface of the discharge tube 350.

That is, in the steam generator 200, as an amount of condensed water passing through the discharge hole 355 is minimized, an amount of water injected into the cavity 100 may be reduced. Also, as the condensed water collected into the steam generator 310 is reheated, steam generation efficiency of the steam generator 200 may be improved.

In summary, the water injected through the inflow tube 315 may be heated by the heater in the steam generator 310, and the steam generated by the heating may flow upward due to a pressure difference to pass through the discharge tube 350 and then be discharged. Condensed water may be generated due to the condensation phenomenon. The condensed water that does not pass through the discharge hole 355 may be collected into the steam generation tube 310 and then be reheated in the steam generation tube 310. Also, the steam discharged through the discharge tube 350 may be introduced into the above-described steam injection hole through the steam discharge hole 451 of the adaptor unit 400 and then be injected into the cooking chamber 101 through the steam injection hole.

The steam generation unit 300 may further include a temperature sensor 330. The temperature sensor 330 may detect an internal temperature of the steam generation tube 310. For example, the temperature sensor 330 may include a RTD sensor.

The temperature sensor 330 may operate by being interlocked or in communication with the heater 320. For example, a controller (not shown) of the cooking apparatus may control an operation of the heater 320 so that the internal temperature of the steam generation tube 310 has an optimum temperature at which the steam is generated on the basis of information detected by the temperature sensor 330.

The adaptor unit 400 may include an injection tube 410 that provides a flow path for water to be supplied into or drained from the steam generation unit 300, the first connection tube 420 connected to the injection tube 410 to provide a flow path through which water is introduced into the steam generation unit 300, and the second connection tube 430 connected to the steam generation unit 300 to provide a flow path for the steam.

The injection tube 410 may be connected to the water supply tank to provide a passage through which water may flow to the steam generation unit 300.

The injection tube 410 may provide a drain path through which residual water may be drained when the operation of the steam generator 200 is stopped to stop generation of the steam. The injection tube 410 may be connected to a drain tank to provide a passage through which the residual water of the steam generation unit 300 may flow to the drain tank. Thus, as the residual water is drained, a scale generation rate and amount may be reduced.

The injection tube 410 may be a tube having a hollow to provide a passage of water. One or a first end of the injection tube 410 may be referred to as an injection hole 411. In the injection tube 410, the water may be injected from the water supply tank through the injection hole 411, or the residual water of the steam generation unit 300 may be discharged to the drain tank through the injection hole 411. That is, the injection hole 411 may be understood as a connection point to which the water supply tank and/or the drain tank may be connected.

A combination portion 415 connected to the collection tube, which will be described hereinafter, may be disposed on one side of the injection tube 410. For example, the combination portion 415 may be an opening defined at one point of the injection tube 410 disposed between the injection hole 411 and the first connection tube 420 and may face a branch tube 435 which will be described hereinafter.

The combination portion 415 may be understood as a connection point to which the collection tube 440 and the injection tube 410 are connected. The water flowing into the collection tube 440 may be introduced into the injection tube 410 and then joined to the water within the injection tube 410 and be introduced again into the steam generation unit 300 by the combination portion 415.

As described above, an installation direction in which the steam generator 200 is installed on the back plate 160 or in the electric room is not limited. However, in the steam generator 200 according to embodiments, water may be introduced to a lower side of the steam generation unit 300 to generate steam, and the generated steam may be discharged at an upper side of the steam generation unit 300. Water discharged together with the steam may be separated from the steam and then be collected in the injection tube 410 through the collection tube 440. The condensed water collected in the steam generation tube 310 along the inner surface of the discharge tube 350 and the water separated from the steam and introduced into the collection tube 440 may flow by force of gravity without using a separate pressure providing device such as a pump for example. Thus, the injection tube 410 may be disposed parallel to an edge of a lower end of the back plate 160.

The first connection tube 420 may be provided as a hollow tube through which water may flow. The first connection tube 420 may have one or a first end connected to the steam generation unit 300 and the other or a second end connected to the injection tube 410. For example, the first injection tube 420 may be provided as a tube that is bent so that the first end thereof connected to the injection tube 410 and the second end thereof connected to the inflow tube 315 are disposed perpendicular to each other. Thus, the steam generation unit 300 may be disposed perpendicular to the direction in which the injection tube 410 is installed. Alternatively, the two openings defined in both ends of the first connection tube 420 are not limited to the structure in which the two opening are disposed perpendicular to each other. For example, the two opening may be arranged at an inner angle of about 180 degrees or less.

An opening defined in the first end of the first connection tube 420 may be referred to as a first connection hole 421. The first connection hole 421 may be connected to the inflow tube 315 as described above, and the water flowing through an inside of the injection tube 410 may be introduced into the steam generation tube 310 through the inflow hole 316 of the inflow tube 315. For example, the inflow tube 315 disposed below the steam generation unit 300 may be inserted into the first connection hole 421 so as to be connected to an outer circumference of the inflow tube 315.

The second connection tube 430 may be provided as a hollow tube through which water may flow. The second connection tube 430 may have one or a first end connected to the steam generation unit 300 and the other or a second end connected to the branch tube 435 which will be described hereinafter. For example, the second injection tube 430 may be provided as a tube that is bent so that the first end thereof connected to the branch tube 435 and the second end thereof connected to the discharge tube 350 are disposed perpendicular to each other. Thus, the branch tube 435 may be disposed perpendicular to a central axis of the discharge tube 350. The steam generation unit 300 and the collection tube 440 may be disposed in parallel to each other. Alternatively, the two openings defined in both ends of the second connection tube 440 are not limited to the structure in which the two opening are disposed perpendicular to each other. For example, the two opening may be arranged at an inner angle of about 180 degrees or less.

An opening defined in the first end of the second connection tube 430 may be referred to as the second connection hole 431. As described above, the second connection hole 431 may be connected to the discharge tube 350. For example, the second connection hole 431 may contact an outer circumference of the discharge tube 350 by inserting the discharge tube 350 therein. The second connection hole 431 may contact an outer surface of the lowermost end of the discharge tube 350.

Alternatively, the second connection tube 430 may have an inner diameter that gradually decreases in the upward direction to correspond to a shape of the discharge tube 350 up to a position into which the discharge tube 350 is inserted. An inner diameter of the second connection tube 430 may increase again toward the branch tube 435 from a point at which the discharge tube 350 is inserted to define the discharge hole 355. Thus, the discharge tube 350, the discharge hole 355, and the second connection tube 430 may provide one venturi tube.

The second connection tube 420 may provide a passage through which the steam discharged from the discharge hole 355 may flow to the branch tube 435.

The water together with the steam may be discharged from the discharge hole 355. A portion of the condensed water generated by the condensation phenomenon in the discharge tube 350 and the water discharged which is instantaneously boiled due to the Dolby phenomenon in the steam generation tube 310 and then discharged may be discharged together with the steam to the second connection tube 420 via the discharge hole 355.

The condensed water due to the condensation phenomenon, which is discharged together with the steam from the steam generation tube 310 via the discharge tube 350 and the water due to the Dolby phenomenon may be referred to as discharge water. The Dolby phenomenon may represent a kind of overheating phenomenon in which a liquid is instantaneously boiled to be injected to the outside.

In the steam generator according to the related art, due to the above-described reason, as water is discharged to the cavity, the performance and steam generation efficiency of the steam generator may be deteriorated wasting the supplied water. On the other hand, in the steam generator 200 according to embodiments, due to the above-described reason, an amount of water discharged together with the steam to the second connection tube 420 may be primarily minimized through the discharge tube 350 and then secondarily collected through the feedback structure due to the branch tube 435 and the collection tube 440. Thus, the steam generator 200 according to embodiments may solve the limitations of the steam generator according to the related art. Hereinafter, the feedback structure related thereto will be described.

The adaptor unit 400 may include the branch tube 435 connected to the second connection tube 430 so that the steam and the water are introduced, a steam discharge tube 450 connected to the branch tube 435 to provide a passage through which the steam may flow, and the collection tube 440 connected to the branch tube 435 to provide a passage through which the water may flow.

The collection tube 440 may have one or a first end connected to the combination portion 415 and the other or a second end connected to the branch tube 435 to collect the water into the injection tube 410.

The branch tube 435 may be connected to branch passages into which the discharge water and the steam discharged from the discharge tube may be introduced and then by which the discharge water and the steam may be branched. That is, the branch tube 435 may be understood as a point at which branch passages by which the discharge water and the steam are branched are connected.

The branch tube 435 may have one or a first end connected to the second connection tube 430 and the other or a second end connected to the steam discharge tube 450 to allow the steam to flow to the cooking chamber 101. An opening connected to the collection tube 440 may be defined in one side of the branch tube 435.

The opening of the branch tube 435, which is connected to the collection tube 440, may be disposed to face a lower side between the points to which the steam discharge tube 450 and the second connection tube 430 are connected. The collection tube 440 connected to the opening may be connected to the combination portion 415. That is, the branch tube 435 may connect the second connection tube 430, the steam discharge tube 450, and the collection tube 440 to each other. Thus, the steam and the water introduced through the second connection tube 430 may be branched into the steam discharge tube 450 and the collection tube 440.

The branch tube 435 may provide a passage through which the steam introduced from the second connection tube 430 may flow to the steam discharge tube 450. The steam may be introduced into the steam discharge tube 450 which may be connected to be bent upward from the branch tube 435.

At the same time, the branch tube 435 may provide a passage through which the water introduced from the second connection tube 430 may flow to the collection tube 440. For example, the collection tube 440 may be disposed below the branch tube 435 and connected to the branch tube 435. Thus, the water may be introduced into the collection tube 440 by force of gravity to flow to the injection tube 410.

In summary, the branch tube 435 may provide branch points at which the steam and the water, which are discharged from the second connection tube 430, may be vertically branched to respectively flow along separate passages. The steam which is a gas may flow to the steam discharge tube 450 connected to the steam injection hole, and the water which is a liquid may flow to the collection tube 440.

The steam discharge tube 450 may provide a passage through which the steam introduced into the branch tube 435 via the second connection tube 430 may flow to the steam injection hole. Also, the steam discharge tube 450 may be provided as a hollow tube through which the steam may flow.

An opening defined in one or a first end of the steam discharge tube 450 may be referred to as the steam discharge hole 451. For example, the steam discharge hole 451 may be understood as a connection point to the passage connected to the steam injection hole. Thus, the steam may flow to the steam injection hole via the steam discharge hole 451.

The steam discharge tube 450 may be connected to be bent upward from the branch tube 435. Thus, even though the water discharged together with the steam from the steam generation unit 300 may be introduced into the steam discharge tube 450, the water may flow again and then be introduced into the collection tube 440.

The collection tube 440 may connect the combination portion 415 to the branch tube 435 as described above. The collection tube 440 may include a first collection tube 441 and a second collection tube 445.

The first collection tube 441 may be provided as a hollow tube through which the water may flow. The first collection tube 441 may have an upper end connected to the branch tube 435 so that the water may be introduced and a lower end connected to the second collection tube 445.

The second collection tube 445 may have a truncate cone shape having an inner diameter that gradually decreases in a downward direction. In the second collection tube 445, an opening having a smallest inner diameter may be connected to the combination portion 415, and an opening having a largest inner diameter may be connected to the first collection tube 441. Also, the first collection tube 441 may have an inner diameter greater than an inner diameter of the injection tube 410.

The water discharged together with the steam from the discharge tube 350 of the steam generation unit 300 may be introduced into the branch tube 435, and the water introduced into the branch tube 435 may flow down through the first collection tube 441 and be introduced into the second collection tube 445. The water introduced into the second collection tube 445 may be mixed with the water flowing through the injection tube 410 via the combination portion 415 and then be introduced again into the steam generation unit 300. Thus, the steam generator 200 may have a feedback structure to reduce a loss of water. Thus, when compared to the steam generator according to the related art, the steam generator 200 may have improved steam generation efficiency relative to water.

The adaptor unit 400 may further include a water level sensor 442 installed on one side of the collection tube 440. The water level sensor 442 may be disposed at one point on the first collection tube 441.

The water level sensor 442 may be installed on the first collection tube 441. The water level sensor 442 may detect a water level that rises to a certain point or level inside the collection tube 440. That is, a water level within the steam generator 200 may be detected.

An installation position of the water level sensor 442 is not limited to the collection tube 440. For example, the water level sensor may be installed on the steam generation tube 310. Also, a plurality of the water level sensor 442 may be provided.

When a use time of the steam generator 200 increases, water collected in the collection tube 440 and water introduced by the injection tube 410 may be filled up to a height corresponding to the one point or level of the steam generator 310 and the collection tube 440.

As the level of the water filled into the steam generation tube 310 and the collection tube 440 is above an optimum level (a high level), an amount of water passing through the discharge tube 350 may increase. Also, as the water level within the collection tube 440 is too high, the water together with the steam may flow toward the steam discharge hole 451 to the steam injection hole. That is, a loss of the water may occur.

The water level sensor 442 may detect the level of water in the collection tube 440 to adjust an amount of water of the steam generator 200. For example, when the water level of the collection tube 440 is above a predetermined optimum level, supply of the water introduced from the water supply tank to the injection tube may be stopped.

A valve may be provided in the passage to which the water supply tank and the drain tank are connected. The steam generator 200 may perform a drain operation to reduce the internal water level to a predetermined level even in a state in which the steam generator 200 continuously generates steam through a switching operation of the valve.

The water level sensor 442 may include an electroconductive type, capacitive type, a differential pressure type, or a float type water level sensor, for example.

In summary, the water level sensor 442 may detect an amount of injected water and an amount of water collected in the collection tube 440. When operation of the steam generator 200 is stopped, the water level sensor 442 may detect a level of residual water remaining in the steam generator 200. Also, an amount of injected water may be detected by the water level sensor 442.

The controller (not shown) may adjust the water injected into the steam generator 200 to an optimal amount using water level information detected by the water level sensor 442. That is, the water level within the steam generator 200 may be optimally maintained. Thus, the water level sensor 442 may prevent the water from being introduced into the steam generator 310 at a level above the optimum level and thus solve the conventional limitation in which the water is easily introduced into the cavity.

Also, in the steam generator 200 according to embodiments, as the water injection passage and the steam discharge passage are distinguished from each other, steam may be continuously generated. Thus, steam may be continuously injected into the cooking chamber 101.

The water may be introduced into the steam generation tube 310 via the injection tube 410, the first connection tube 420, and the inflow tube 315. Thus, the injection tube 410, the first connection tube 420, and the inflow tube 315 may be referred to as an injection passage. The steam generated in the steam generation tube 310 may be discharged to the cooking chamber 101 via the discharge tube 350, the second connection tube 430, the branch tube 435, and the steam discharge tube 450. Thus, the discharge tube 350, the second connection tube 430, the branch part 435, and the steam discharge tube 450 may be referred to as a steam discharge passage. The water discharged from the discharge tube 350 due to the Dolby phenomenon or the condensation phenomenon may be injected into the injection tube 410 via the second connection tube 430, the branch tube 435, the first collection tube 441, the second collection tube 445, and the combination portion 415 and then be mixed with the steam. Thus, the second connection tube 430, the branch tube 435, the first collection tube 441, the second collection tube 445, and the combination portion 415 may be referred to as a collection passage.

Each of the plurality of tubes 410, 420, 430, 435, 440, and 450 forming the adaptor unit 400 may be made of a silicon material, for example.

For a more clear description of the steam generator 200 according to embodiments, the reference of direction will be described. Referring to FIG. 5, a longitudinal direction from the inflow hole 316 of the steam generation tube 310 to the discharge hole 355 may be understood as a vertical direction. Also, a direction, in which the temperature sensor 330 is disposed, from the steam generation tube 310 may be understood as a rearward direction, and an opposite direction of the rearward direction may be understood as a frontward direction. Thus, the back plate 160 may be disposed at a front of the steam generator 200, and the adaptor unit 400 may be disposed at one side of the steam generation unit 300.

According to embodiments disclosed herein, high-temperature, high-pressure steam in which thermal loss is minimized may be generated to improve performance of the steam generator. Also, the high-temperature, high-pressure steam may be transferred to food to improve a cooking performance of the cooking apparatus.

According to embodiments disclosed herein, water discharged by the Dolby phenomenon may be collected by the feedback structure to improve steam generation efficiency relative to supplied water. Also, as water is reused, the same or more steam may be generated even though a relatively small amount of water in comparison to the related art is used to improve efficiency with respect to the water.

According to embodiments disclosed herein, the water level of the water injected into the steam generator may be confirmed and adjusted by the water level sensor. Thus, a high water level within the steam generator may be prevented to prevent the water from being discharged together with the steam, thereby improving reliability of the steam generator and cooking apparatus including the steam generator.

According to embodiments disclosed herein, condensed water may be collected by the discharge tube having a cone shape and then reheated to reuse the water. Thus, efficiency with respect to use of water may be improved to reduce energy consumption.

According to embodiments disclosed herein, as the inflow of water and discharge of steam are continuously performed at the same time in the steam generator, the steam may be continuously injected into the cavity. Therefore, performance of the cooking apparatus may be improved.

According to embodiments disclosed herein, a generation rate of scale and a generation amount of scale may be reduced to maintain thermal conductivity from the heater and reduce the pressure loss due to a fine change of in tube diameter. Therefore, manageability of the steam generator may be improved, and a lifespan of the apparatus may be prolonged.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A steam generator, comprising:
   a steam generation tube;
   an inflow tube configured to provide a passage so that water is introduced into the steam generation tube;
   at least one heater disposed on an outer surface of the steam generation tube to heat the water and generate steam;
   a discharge tube disposed above the steam generation tube to provide a passage through which the steam is discharged, wherein the discharge tube has an inner diameter that gradually decreases in an upward direction; and
   an adaptor unit configured to separate discharge water discharged from the discharge tube and the steam, wherein the adaptor unit comprises:
     an injection tube connected to a water supply tank configured to supply the water, the injection tube being configured to provide a passage through which the water flows to the inflow tube;
     a branch tube to which passages branched to allow the discharge water and the steam to flow therein are connected; and
     a collection tube connected to the branch tube to provide a passage so that the discharge water flows to the injection tube, wherein the collection tube comprises:
       a first collection tube disposed below the branch tube;
       a second collection tube configured to connect the first collection tube to the injection tube, wherein the second collection tube has an inner diameter that gradually decreases in a downward direction; and
     a steam discharge tube connected to the branch tube to provide a passage so that the steam is discharged from the steam generator.

2. The steam generator according to claim 1, wherein the at least one heater comprises:
   a first heater that protrudes from an outer surface of the steam generation tube to extend along a longitudinal direction of the steam generation tube; and
   a second heater disposed symmetrical to the first heater with respect to the steam generation tube, wherein the first heater and the second heater surface-contact the steam generation tube to transfer heat to the steam generation tube.

3. The steam generator according to claim 1, wherein the discharge tube has a conical shape with a truncated end.

4. The steam generator according to claim 1, further comprising:
   a temperature sensor installed at one side of the steam generation tube to detect a temperature.

5. The steam generator according to claim 1, wherein the inflow tube is disposed below the steam generation tube and has an inner diameter less than an inner diameter of the steam generation tube.

6. The steam generator according to claim 1, wherein the adaptor unit further comprises:
   a first connection tube that connects the injection tube to the inflow tube; and
   a second connection tube connected to the discharge tube, the second connection tube providing a passage through which the steam and the discharge water flow.

7. The steam generator according to claim 6, wherein the injection tube, the first connection tube, and the inflow tube provide an injection passage through which the water is supplied, and the discharge tube, the second connection tube, and the collection tube provide a collection passage through which the discharge water is collected to be introduced again into the inflow tube.

8. The steam generator according to claim 1, wherein the injection tube provides a passage through which residual water of the steam generation tube is discharged.

9. The steam generator according to claim 1, wherein the steam discharge tube is bent upward from the branch tube.

10. The steam generator according to claim 1, wherein a combination portion in the form of an opening connected to the second collection tube is defined in one side of the injection tube.

11. The steam generator according to claim 1, wherein the adaptor unit further comprises a water level sensor installed at one side of the collection tube to detect a water level within the collection tube.

12. A cooking appliance comprising the steam generator according to claim 1.

13. A cooking apparatus, comprising:
    a cavity having a cooking chamber; and
    a steam generator configured to provide steam to the cooking chamber;
    wherein the steam generator comprises:
      a steam generation tube into which the water is introduced to generate steam;
      a first heater and a second heater, which are installed symmetrical to each other on an outer surface of the steam generation tube;

an injection tube configured to provide a passage through which the water is injected into the steam generation tube;

a discharge tube disposed above the steam generation tube to provide a passage through which the steam is discharged, the discharge tube having an inner diameter that gradually decreases in an upward direction;

a branch tube that separates the steam and discharge water discharged from the discharge tube;

a collection tube connected to the branch tube to provide a passage through which the discharge water flows to the injection tube, wherein the collection tube has a truncated cone shape having an inner diameter that gradually decreases in a downward direction to a point at which the collection tube and the injection tube are connected.

14. The cooking apparatus according to claim 13, further comprising:

a drain pump configured to provide a pressure so that residual water of the steam generator is drained; and a drain device in which the drained residual water is stored, wherein the injection tube comprises a valve configured to be switched so that the passage is selectively connected to one of the water supply tank or the drain device.

15. The cooking apparatus according to claim 14, wherein the cavity comprises a back plate disposed behind the cooking chamber, and the steam generator is installed on the back plate.

16. The cooking apparatus according to claim 15, wherein the steam generator further comprises:

a first connection tube bent in a vertical direction to connect the injection tube to the steam generation tube; and a steam discharge tube connected to the branch tube to provide a passage so that the steam flows into the cooking chamber.

17. The cooking apparatus according to claim 16, wherein the steam generator further comprises a water level sensor installed at one side of the collection tube to detect a water level, where a switching operation of the valve is performed according to information of the water level detected by the water level sensor.

18. A steam generator, comprising:

an injection tube configured to supply water to form steam, the injection tube having a central longitudinal axis extending in a horizontal direction;

a steam generation unit in fluid communication with the injection tube, the steam generation unit comprising:

an inflow tube that receives water from the injection tube;

a steam generation tube in which steam is created from the water, wherein a central longitudinal axis of the steam generation tube extends in a vertical direction;

at least one heater that heats the steam generation tube to create steam; and a discharge tube through which the steam is discharged from the steam generation tube, wherein the discharge tube has an inner diameter that gradually decreases in an upward direction;

a connection tube connected to an upper portion of the discharge tube, the connection tube providing a passage through which steam and discharge water flow;

a branch tube connected to the connection tube and configured to separate the steam and the discharge water discharged from the discharge tube, and a steam discharge tube through which the steam discharged from the discharge tube flows and bent to extend from the branch tube, wherein an uppermost portion of the branch tube is disposed below an uppermost portion of the connection tube.

19. The steam generator according to claim 18, further comprising:

a collection tube that extends in the vertical direction between the branch tube and the injection tube and which is configured to direct the residual water to the injection tube.

* * * * *